(12) United States Patent
Iso-Sipila (10) Patent No.: US 7,035,797 B2
(45) Date of Patent: Apr. 25, 2006

(54) DATA-DRIVEN FILTERING OF CEPSTRAL TIME TRAJECTORIES FOR ROBUST SPEECH RECOGNITION

(75) Inventor: Juha Iso-Sipila, Tampere (FI)

(73) Assignee: Nokia Corporation, Espoo (FI)

( * ) Notice: Subject to any disclaimer, the term of this patent is extended or adjusted under 35 U.S.C. 154(b) by 665 days.

(21) Appl. No.: 10/017,000
(22) Filed: Dec. 14, 2001

(65) Prior Publication Data
US 2003/0115054 A1 Jun. 19, 2003

(51) Int. Cl.
*G10L 21/02* (2006.01)

(52) U.S. Cl. ............................ 704/227; 704/234
(58) Field of Classification Search ........ 704/226–228, 704/234, 203–206, 224, 243
See application file for complete search history.

(56) References Cited

U.S. PATENT DOCUMENTS

| 4,227,176 | A | * | 10/1980 | Moshier ............... 704/231 |
| 6,092,039 | A | * | 7/2000 | Zingher ............... 704/221 |
| 6,157,909 | A | * | 12/2000 | Mauuary et al. ....... 704/228 |
| 6,266,633 | B1 | * | 7/2001 | Higgins et al. ......... 704/224 |
| 6,308,155 | B1 | * | 10/2001 | Kingsbury et al. ...... 704/256 |
| 2003/0004720 | A1 | * | 1/2003 | Garadadri et al. ...... 704/247 |

FOREIGN PATENT DOCUMENTS

EP 0871157 10/1998

OTHER PUBLICATIONS

Tom Claes and Dirk Van Compernolle, "SNR-Normalization for Robust Speech Recognition," Proc. Int. Conf. Acoust., Speech, and Sig. Proc., vol. 1, pp. 331-334, 1996.*

ETSI ES 201 108 v1.1.2 (Apr. 2000) Speech Processing, Transmission and Quality aspects (STQ); Distributed speech recognition; Front-end feature extraction algorithm; Compression algorithms, pp 1-20.

Nokia ETSI_STQ W1008; DSR Front-End Proposal for the Advanced Noise Robust Front-End; Oct. 29, 1999, 9 PAGES.

Data-Driven Design of RASTA-like Filters; van Vuuren et al.; Proc. EUROSPEECH, pp. 409-412, 1997.

"RASTA Processing of Speech", Hermansky, IEEE Trans. on Speech and Audio Processing, vol. 2, No. 4, pp. 578-589, 1994.

"Cepstral domain segmental feature vector normalization for noise robust speech recognition", O. Viikki et al., Speech Communication, vol. 25, pp. 133-147, 1998, Elsevier.

* cited by examiner

*Primary Examiner*—Donald L. Storm
(74) *Attorney, Agent, or Firm*—Ware, Fressola, Van Der Sluys & Adolphson LLP (57) ABSTRACT

A method and apparatus for speech processing in a distributed speech recognition system having a front-end and a back-end. The speech processing steps in the front-end are as follows: extracting speech features from a speech signal and normalizing the speech features in order to alter the power of the noise component in the modulation spectrum in relation to the power of the signal component, especially with frequencies above 10 Hz. A low-pass filter is then used to filter the normalized modulation spectrum in order to improve the signal-to-noise ratio (SNR) in the speech signal. The combination of feature vector normalization and low-pass filtering is effective in noise removal, especially in a low SNR environment.

20 Claims, 6 Drawing Sheets

DATA-DRIVEN FILTERING OF CEPSTRAL TIME TRAJECTORIES FOR ROBUST SPEECH RECOGNITION

FIELD OF THE INVENTION

The present invention relates generally to the field of speech recognition and, more particularly, to speech recognition in a wireless communications system and in a Distributed Speech Recognition (DSR) system and methodology.

BACKGROUND OF THE INVENTION

Speech recognition technology allows a user of a telecommunications network to access computer services without using a keyboard to type in words, while a spoken language system provides user-computer interaction, which enables natural conversations between people and machines. In particular, Distributed Speech Recognition (DSR) systems allow a user to give a verbal command, or dictate a memo, to a speech-processing device at one location and have the spoken words converted into written texts by a speech recognizer at another location. For example, the user can speak into a wireless device, such as a mobile phone, but the voice is recovered by a network device at a remote location. One of the emerging applications of DSR is a Voice Browser or a Wireless Application Protocol (WAP) Browser, which allows anyone who has a telephone to access Internet-based services without being near a computer. DSR has many benefits. For example, voice interaction eliminates the need of having a keypad on a mobile device where physical space is limited for keypads and displays.

A DSR system is roughly divided into a front-end portion and a back-end portion. The front-end algorithm converts the input speech waveform signal into feature parameters, which provide a compact representation of the input speech, while retaining the information essential for speech recognition. The back-end algorithm performs the actual recognition task, taking feature parameters as input and performing a template-matching operation to compare the features with reference templates of the possible words to be recognized.

In traditional Automatic Speech Recognition (ASR), both the front end and back end are located at the speech recognition server, which is accessed through the Public Switched Telephone Network (PSTN) speech connection. If the speech signal comes from a mobile phone user, significant degradation of speech recognition accuracy may result from speech coding inaccuracies and radio transmission errors. Moreover, if the recognition results from ASR are used to drive a service that returns data to the user terminal, separate speech and data connections between the user terminal and the service are required.

DSR solves these problems of ASR by placing the front-end at the user terminal and transmitting feature parameters instead of the encoded speech waveform to the ASR server. Usually, feature parameters require less bandwidth for radio transmission than the encoded speech waveform. The feature parameters can, therefore, be sent to the ASR server using a data channel. This will eliminate the need for a high, bit-rate speech channel. Moreover, a low-rate data transmission is less affected by noise and distortion, as compared to a speech-channel transmission. Furthermore, if the data channel is equipped with error correction coding, the radio interface errors are no longer an issue. The full duplex data connection used to transmit the features to the ASR server can also be used to send the response data (or the encoded speech) from the ASR server to the user terminal.

One of the major disadvantages of the above-mentioned DSR methodology is that the ASR server must be able to receive and use the features coming from the standard front-end. Therefore, to support DSR, ASR vendors will have to modify their ASR engines to accommodate the DSR features. Depending on the technology used, this may be a minor undertaking or a technical challenge. If the feature vectors are sent to the ASR server using the fourteen components for each 10 ms frame of speech, the resulting bit-rate would be 44.8 kbps, assuming floating point coefficients and no framing overhead. This bit-rate is clearly too high for cellular data channels.

The European Telecommunications Standard Institute (ETSI) is currently in the process of establishing the standard for DSR signal processing. ETSI has published in ETSI ES 201 108 V1.1.2 a standard algorithm for front-end feature extraction and their transmission. The standard algorithm calculates feature vectors with fourteen components in 10 ms frames of speech. In particular, this ETSI publication covers the algorithm for front-end feature extraction to create Mel-Frequency Cepstral Coefficients (MFCCs). In order to allow cellular data channels to be used for data transmission, the ETSI standard also includes a feature compression algorithm to provide an efficient way to transmit the coefficients in a lower data transmission rate. This compression algorithm combines 24 feature vectors, each of which is calculated from one 10 ms frame of speech, to a multiframe of 143 bytes. This yields a bit-rate of roughly 4,767 bps. The ETSI publication also includes the formatting of the extracted features with error protection into a bit-stream for transmissions and the decoding of the bit-stream to obtain the speech features at a back-end receiver, together with the associated algorithm for channel error mitigation. Nokia ETSI-STQ W1008 also discloses a front-end algorithm for feature-vector extraction.

Cepstrum is a term for the inverse Fourier Transform of the logarithm of the power spectrum of a signal, and mel-frequency warping is a process for non-linearly modifying the scale of the Fourier transform representation of the spectrum. From the mel-frequency-warped Fourier transform representation of the log-magnitude spectrum, a set of cepstral coefficients, or feature parameters, are calculated to represent the speech signals. The extracted cepstral coefficients or parameters are known as feature vectors. They are conveyed to the back-end recognizer to perform the actual probability estimation and classification in order to reconstruct the spoken words.

Figure 1A:
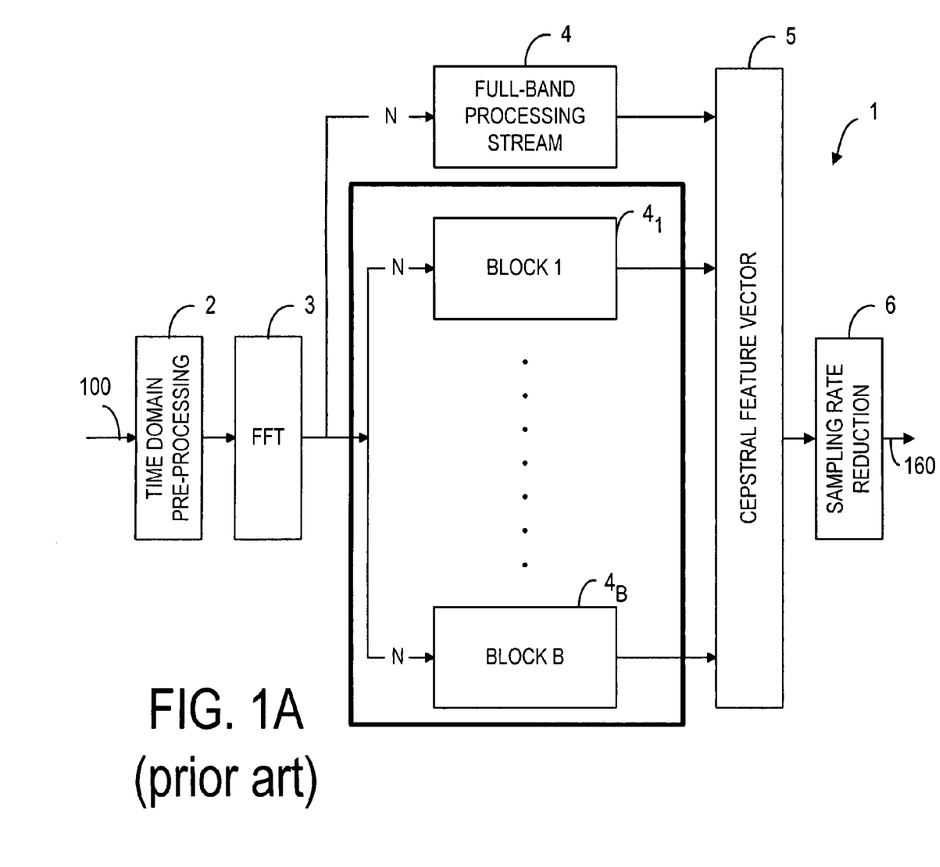
FIG. 1A is block diagram showing a prior art DSR front-end.
Figure 1B:
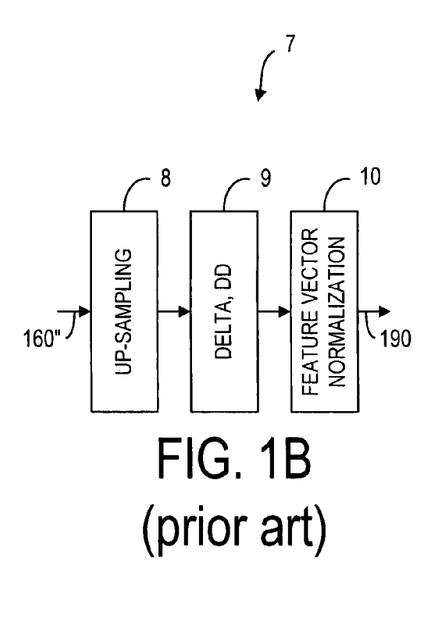
FIG. 1B is a block diagram showing a prior art DSR back-end.
Figure 2:
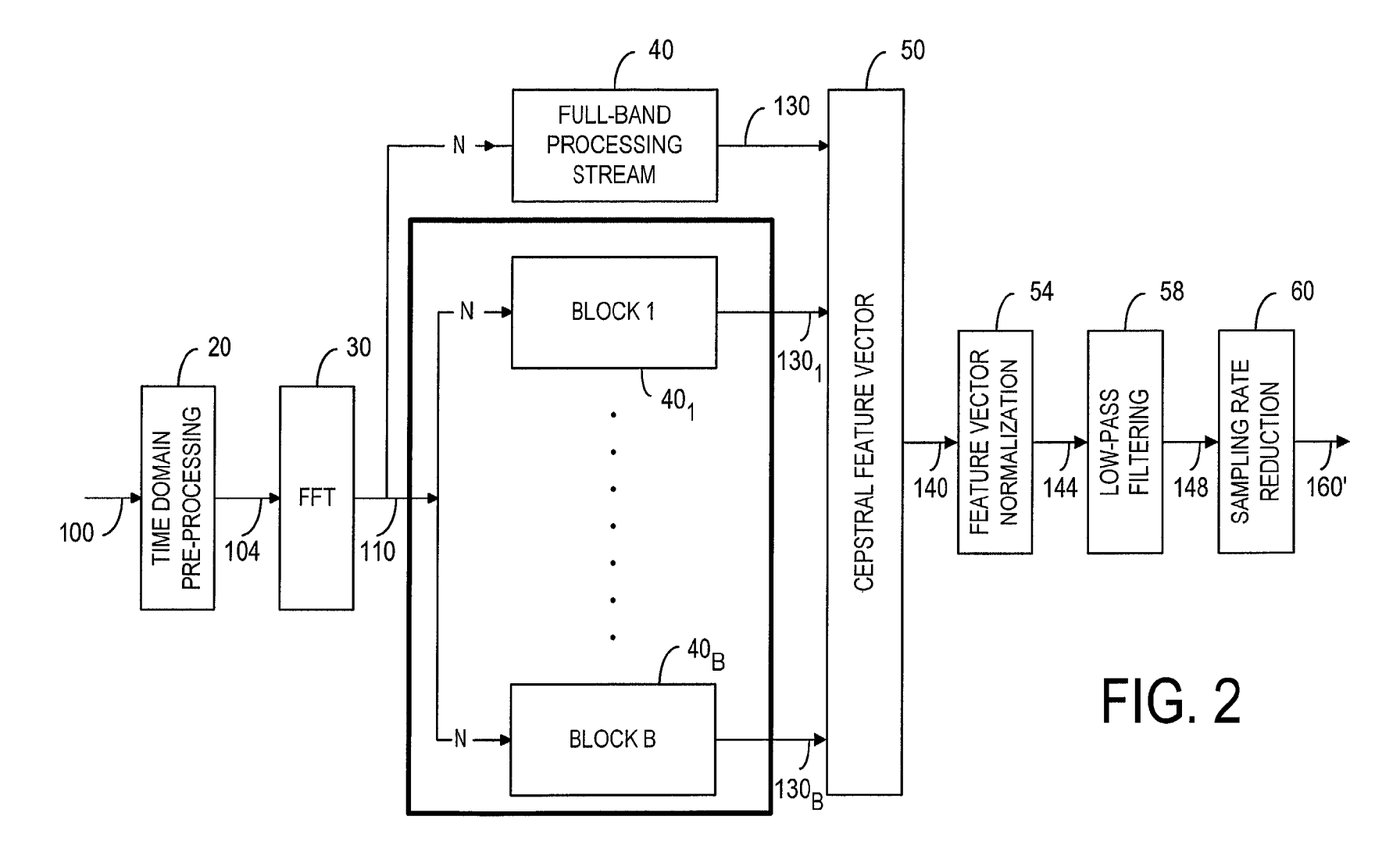
FIG. 2 is a block diagram illustrating a distributed-speech recognition front-end, according to the present invention.

The DSR front-end 1 and back-end 7, according to Nokia ETSI-STQ W 1008, are shown in FIGS. 1A and 1B, respectively. As shown in FIG. 1A, as the speech signal 100 is conveyed to a time-domain pre-processing block 2, it is converted to a digital signal. The digital signal is segmented into frames, each having N samples. An FFT block 3 is used to compute from the pre-processed signal a magnitude spectrum and generate N-spectral magnitude values. In particular, a Fast Fourier Transform is performed to produce a set of coefficients or spectral values. Typically, the entire spectrum of coefficients is conveyed to a full-band processing block 4 to compute a set of mel-frequency cepstral coefficients (MFCCs). At the same time, the same spectrum of coefficients is divided into sub-parts, each corresponding to a different frequency sub-band to be processed by a plurality of sub-band processing blocks $4_1, \ldots, 4_B$ into additional sets of MFCCs. From the sets of MFCCs, a feature-vector assembling block 5 forms a data unit, known as a feature vector, for each frame. Often, additional information concerning the time derivatives of each MFCC is also provided. For example, a feature vector may also contain information about the first and second time derivatives of each cepstral coefficient. A conventional method for incorporating temporal information into speech vectors is to apply linear regression to a series of successive cepstral coefficients to generate first- and second-different cepstra, referred to as 'delta' and 'delta-delta' cepstra. Although the feature vector can be transmitted, as such, to a back-end for speech recognition, it is usually preferred to reduce the amount of data to be transmitted. Thus, the feature vector of each frame is subjected to down sampling by a factor of 2 or 3 by a down-sampling device 6 before speech data is transmitted to the back-end. The down-sampled speech data is denoted by reference numeral 160. It should be noted that the time domain processing block 2, the FFT block 3, the processing means 4, $4_1, \ldots, 4_B$, and the cepstral feature vector assembling block 5 are basically the same as the corresponding blocks 20, 30, 40, $40_1, \ldots, 40_B$, 50 of the distributed speech recognition front-end of the present invention, as shown in FIG. 2. These blocks will be described in more detail in conjunction with FIG. 2 later.

At the DSR back-end 7, as shown in FIG. 1B, the received feature-vector coefficients 160" are up-sampled by the same down-sampling factor by an up-sampling device 8 so that the up-sampled features are reproduced at the original frame rate. The static feature-vector coefficients are then augmented with their first- and second-order time derivatives at block 9. The first- and second-order derivatives are appended to the static coefficients to produce the feature vector for one frame. At the final block 10 of the back-end as shown in FIG. 1B, a simple recursive normalization is usually carried out on the cepstral feature-vector domain in order to reduce the mismatch that may occur between training and testing environments. The output 190 from the block 10 is signal indicative of normalized feature vectors.

One of the major disadvantages of the DSR methodology, as set forth by ETSI, is that the statistics of speech signals vary greatly, depending on the test environment of the speech recognition system. Thus, the noise component in the feature parameters may not be effectively removed. In a noisy environment, the efficiency of speech recognition, in terms of word accuracy, may not be high enough.

Thus, it is desirable to provide a distributed-speech feature extraction method and system, wherein the noise component can be removed effectively.

SUMMARY OF THE INVENTION

It is the primary objective of the invention to improve the efficiency of speech recognition in a noisy environment. This objective can be achieved by changing the speech parameter statistics in various environments. In particular, the objective can be achieved by increasing the power of the noise modulation spectrum in relation to the power of the speech modulation in order to efficiently filter out the noise component in the speech parameters at the front-end of a DSR system.

Accordingly, the first aspect of the present invention is a method for speech processing in a distributed speech recognition system having a front-end and a back-end for recognizing words from a speech signal. The method comprises the steps of extracting speech features from the speech signal, wherein the speech features contain a speech-to-noise ratio; normalizing the speech features; filtering the normalized speech features in a frequency domain in order to increase the speech-to-noise ratio in the normalized speech features; and conveying the filtered-speech features from the front-end to the back-end.

Preferably, the filtering step is carried out with a low-pass filter.

Preferably, the low-pass filter is a data-driven filter.

Preferably, the method further comprises the step of converting the speech signal from a time domain to a frequency domain prior to extracting the speech features.

Preferably, the method further comprises the step of converting the speech signal from an analog form to a digital form prior to converting the speech signal from the time domain to the frequency domain.

Preferably, the time-to-frequency domain conversion is carried out by a Fast Fourier Transform in order to compute a magnitude spectrum and provide a plurality of spectral magnitude values.

Preferably, the method further comprises the step of non-linearly modifying the magnitude spectrum in order to generate a plurality of mel-frequency warped spectral magnitude values.

Preferably, the method further comprises the step of assembling the mel-frequency warped spectral magnitude values in order to produce a set of feature vectors representative of the speech features.

The second aspect of the present invention is a distributed-speech recognition front-end, which comprises:

a feature extractor, responsive to a speech signal, for extracting speech features from the speech signal and for providing a first signal indicative of the extracted speech features;

a normalization device, responsive to the first signal, for normalizing the extracted speech features and for providing a second signal indicative of the normalized speech features;

a frequency filter, responsive to the second signal, for filtering the normalized speech features in a frequency domain in order to reduce noise in the second signal and for providing a third signal indicative of the filtered speech features; and a transmission device for conveying the third signal to a distributed speech recognition back-end in order for the back-end to recognize words representative of the speech signal.

Preferably, the frequency filter is a data-driven filter.

Preferably, the feature extractor includes: a time-domain pre-processing device to convert the speech signal to a digital signal; a time-to-frequency domain conversion device to provide a set of spectral-magnitude values from the digital signal; and an assembling device to assemble the set of spectral-magnitude values into a feature vector representative of the speech features.

Preferably, the front-end also includes a down-sampling device to reduce the sampling rate of the filtered speech features prior to conveying the third signal to the distributed speech recognition back-end.

The third aspect of the present invention is a distributed speech recognition system. The system comprises:

a front-end, responsive to a speech signal, for extracting speech features from the speech signal and for providing a first signal indicative of the extracted speech features; and a back-end, responsive to the first signal, for recognizing words representative of the speech signals and for providing a second signal indicative of the recognized words, wherein the front-end has means to normalize the extracted-speech features and means to filter the normalized speech features in order to reduce noise in the speech signal.

The fourth aspect of the present invention is a speech-feature extractor for providing speech features from a speech signal. The speech feature extractor comprises:

a time-to-frequency domain transformer, responsive to the speech signals, for generating spectral magnitude values in a frequency domain of the speech signal and for providing a first signal indicative of the spectral magnitude values;

a feature generator, responsive to the first signal, for generating a plurality of feature vectors and for providing a second signal indicative of the generated feature vectors;

a normalizing mechanism, responsive to the second signal, for normalizing the generated feature vectors and for providing a third signal indicative of the normalized feature vectors; and a frequency filter, responsive to the first signal, for reducing noise in the normalized feature vectors and for providing the speech features indicative of the noise-reduction feature vectors.

The fifth aspect of the present invention is a communication device having a voice input unit to allow a user to input speech signals to the device, and means for providing speech data to an external apparatus, wherein the external apparatus includes a distributed-speech recognition back-end capable of recognizing speech based on the speech data. The communication device comprises a front-end unit, responsive to the speech signals, for extracting speech features from the speech signals for providing a first signal indicative of the extracted speech features, wherein the front-end includes:

means, responsive to the first signal, for normalizing the extracted-speech features for providing a second signal indicative of the normalized speech features, and means, responsive to the second signal, for filtering the normalized speech features in order to reduce noise in the speech signals and for including the filtered speech features in the speech data.

The present invention will become apparent upon reading the description taken in conjunction with FIGS. 2 to 6.

DETAILED DESCRIPTION

Figure 5A:
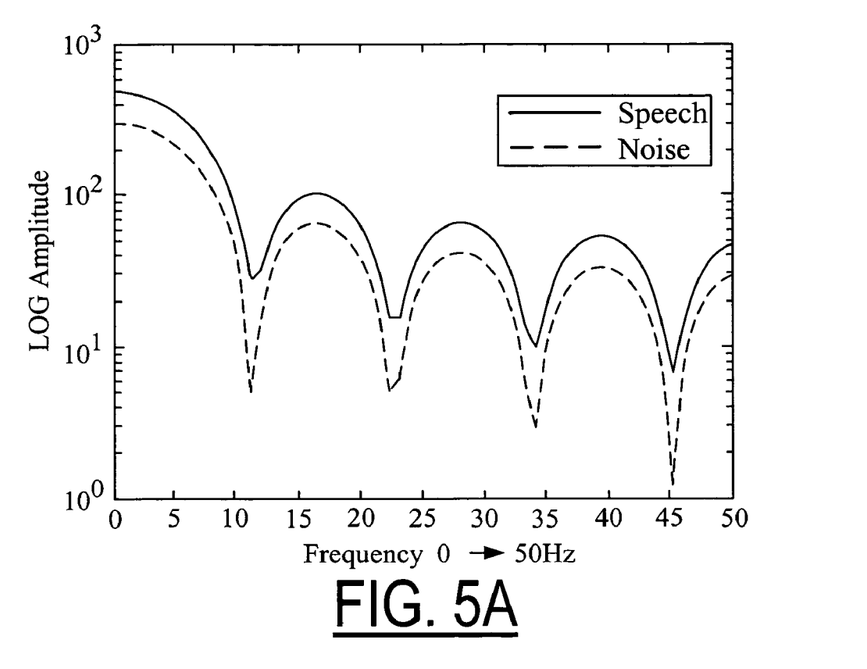
FIG. 5A is a non-normalized cepstral modulation spectrum, showing the noise and speech components in the speech features.

As shown in FIG. 2, a distributed-speech recognition front-end 12 includes a time-domain pre-processing device 20 to receive and process a speech signal 100. As discussed in ETSI ES 201 108 V1.1.2 and Nokia ETSI-STQ W1008, the time-domain pre-processing device is typically used for sampling and pre-emphasizing the speech signal 100 with a low-order, high-pass filter and then segmenting the speech signal into 30 ms frames with 10 ms spacing. Each frame is multiplied by a 30 ms Hamming window. Pre-emphasis is a filtering process in which the frequency response of the filter has emphasis at a given frequency range. In speech recognition, the high-frequency range of the signal spectrum is pre-emphasized. The time-domain pre-processed speech signal is denoted by numeral 104. In an FFT device 30, a Fast Fourier Transform algorithm is used to convert the speech samples 104 from the time domain to the frequency domain in order to compute the magnitude spectrum of the speech signal. From the magnitude spectrum, a plurality of spectral magnitude values 110 is obtained. In addition to full-band processing of the spectral magnitude values 110 in a full-band processing stream, as shown in block 40, in order to obtain a set of mel-frequency cepstral coefficients (MFCCs), the magnitude spectrum is also filtered by a set of triangular band-filters, according to the non-linear mel-frequency scale, in order to divide the Fourier spectrum of each frame into a plurality of frequency bands to be processed in parallel by a plurality of sub-band blocks $40_1, \ldots, 40_B$. For example, if the frequency range of the full band is 0–4 kHz, the FFT output spectrum of each frame can be divided into four sub-band streams of four frequency ranges of 0–0.9 kHz, 0.9–1.8 kHz, 1.8–2.8 kHz and 2.8–4 kHz. The output of the full-band processing block 40 and sub-band processing blocks $40_1, \ldots, 40_B$ are a plurality of sets of MFCCs, denoted by numerals $130, 130_1, \ldots, 130_B$ to be assembled into a feature vector at block 50. Every time a new cepstrum is calculated, a feature vector is formed. As one feature vector is produced every 10 ms, a sequence of feature vectors produced in a given time interval is called a cepstral time trajectory. The frequency content of the cepstral time trajectory is called a modulation spectrum, which contains a speech component and a noise component. The modulation spectrum is denoted by numeral 140. Typically, the power of the noise component in the modulation spectrum is lower than the power of the speech component, as shown in FIG. 5A. Accordingly, the effect of using a low-pass filter to reduce the noise component is minimal at best. In order to more effectively reduce the noise component in the modulation spectrum 140, a normalization process is carried out by a normalization device 54 in order to change the power of the noise component relative to the power of the speech component before a low-pass filter is used to filter out the high-frequency components in the cepstral modulation spectrum. Normalization in the feature vector domain tends to mitigate any degradation in speech-recognition performance due to a possible mismatch between training and test environments. This normalization process is the subject of European patent application No. 98660024.5, which was published on Oct. 14, 1998 and designated as EP 0871 157 A2. With this normalization step, the short-term means and variances of each feature vector component are set to zero and one, respectively, regardless of the environments. The short-term means, $x_i$, and the mean square values, $x_i^2$, are updated according the following equations:

$$\bar{x}_i = \alpha \cdot \bar{x}_{i-1} + (1-\alpha) \cdot x_i$$

$$\overline{x_i^2} = \alpha \cdot \overline{x_{i-1}^2} + (1-\alpha) \cdot x_i^2$$

where i is the frame number and α is the forgetting factor. The mean and the standard deviation estimates for each feature vector component are then computed according to the following equations:

$$\mu_i = \overline{x}_i$$

$$\sigma_i = \sqrt{\overline{x_i^2} - \overline{x_i}^2}$$

where μσ and x stand for the mean, standard deviation and sample value, respectively. Each feature vector element is then normalized in the following way:

$$\hat{x}_i = \frac{x_i - \mu_i}{\sigma_i}$$

Figure 5B:
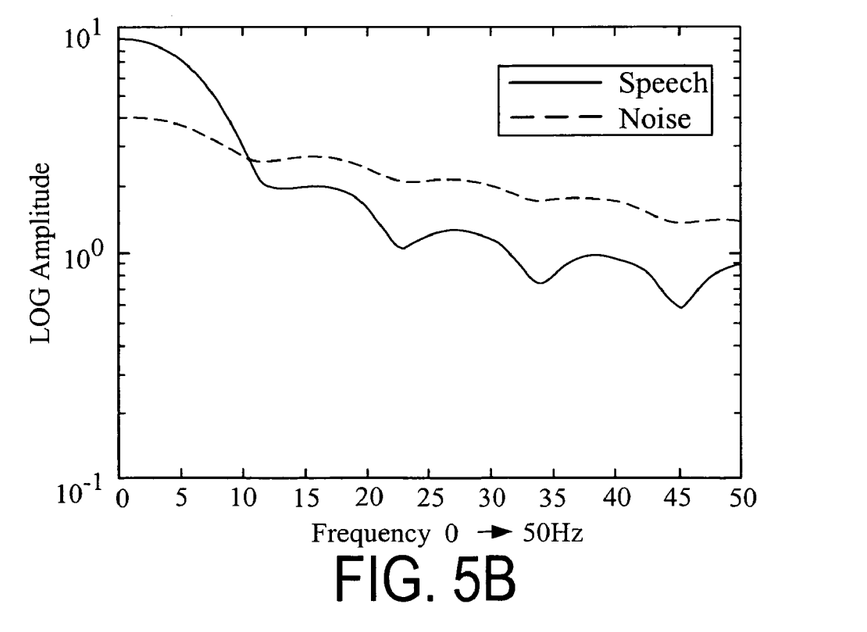
FIG. 5B is a normalized cepstral modulation spectrum, showing the noise and speech components in the speech features.

After the cepstral modulation spectrum is normalized, the power of the noise component, in relation with the power of the speech component, increases significantly, especially in the high-frequency range beyond 10 Hz. For comparison, the non-normalized cepstral modulation spectrum is shown in FIG. 5A, and the normalized cepstral modulation spectrum is shown in FIG. 5B. The normalized cepstral modulation spectrum is denoted by numeral 144. A low-pass filter 58 is then used to reduce the high-frequency components of the normalized cepstral modulation spectrum 144 in order to reduce the noise component in the speech features. Such filtering has the effect of improving speech recognition in noisy environments, because more of the noise component than the speech component is removed. The filtered cepstral modulation spectrum, or a series of filtered feature vectors, is denoted by numeral 148. Preferably, the low-pass filter 58 for reducing noise from the normalized cepstral modulation spectrum is a data-driven filter, which will be described in more detail later. Finally, the feature vector of each frame is subjected to down sampling by a factor of 2 or 3, in order to reduce the rate of transmitting speech data from the front-end to the back-end. The down-sampled feature vectors are denoted by numeral 160'.

In order to complete the speech recognition task, a DSR back-end must be used to perform the actual recognition process, taking the down-sample feature vectors 160" as input and inverting the input into words. The DSR back-end, which is not part of the present invention, has been described in conjuction with FIG. 1B.

Figure 3:
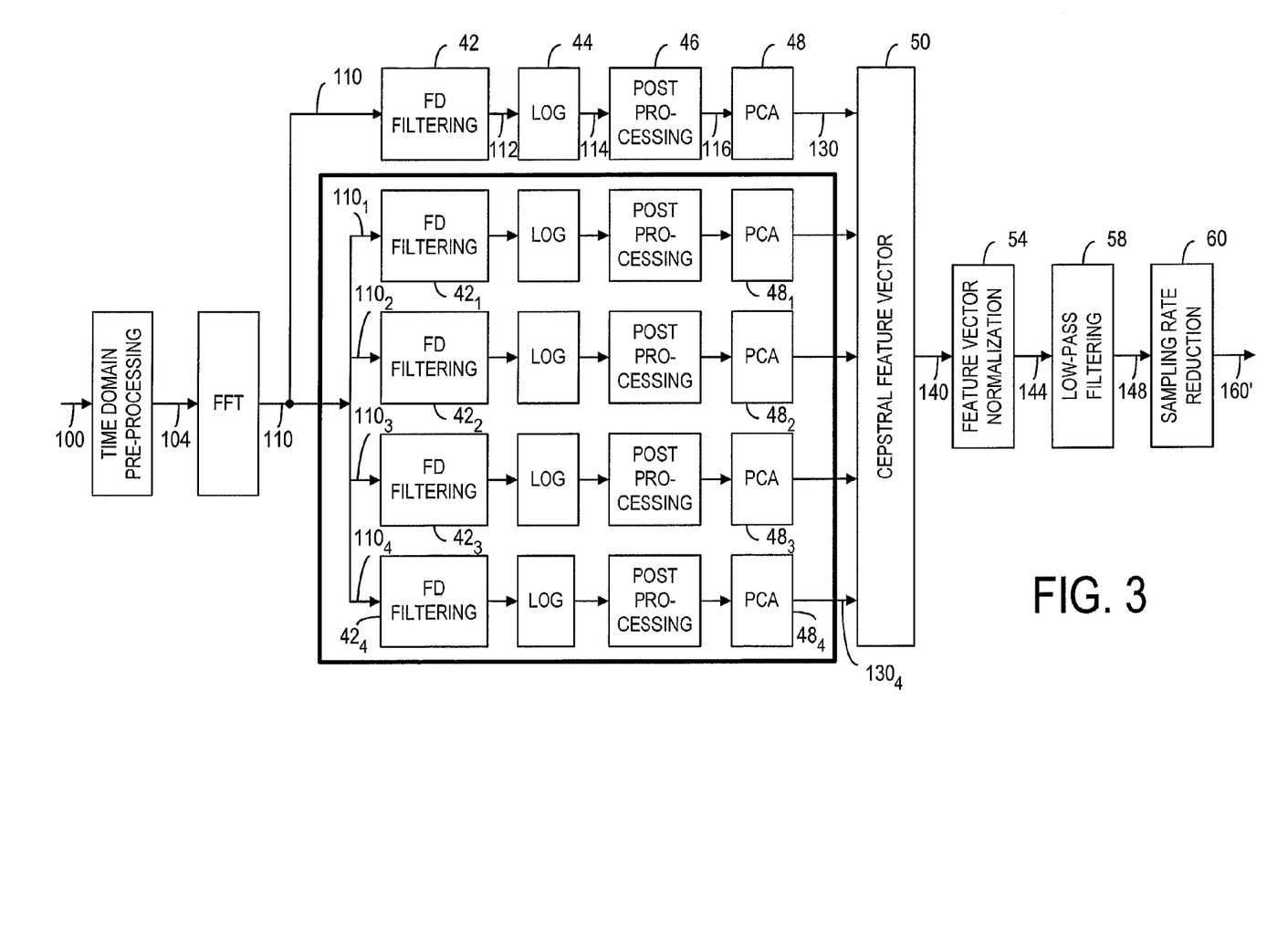
FIG. 3 is a block diagram illustrating the details of mel-frequency warping processes in the distributed-speech recognition front-end.

The extraction of speech features from the spectral magnitude values 110 in order to obtain a set of MFCCs is illustrated in FIG. 3. The steps for processing each sub-band stream in each of the sub-band processors $40_1, \ldots, 40_B$ is identical to the steps for processing the full-band stream in the full-band processor 40 (see FIG. 2). These processing steps are denoted by numerals 42, 44, 46 and 48. At step 42, the spectral magnitude coefficients 110 are subjected to auditory-based frequency division (FD) filtering. Typically, the low frequency components of the magnitude spectrum are ignored. The useful frequency band lies between 115 Hz and half of the actual sampling frequency. The band is divided into 22 channels, equidistant in the mel-frequency domain, in the case of the full-band streams. For the sub-band streams, 11 channels, equidistant in the mel-frequency domains, are obtained for each band. Mel-frequency is a term for describing a frequency warping process called mel-frequency warping, which non-linearly modifies the scale of the Fourier transform representation of the magnitude spectrum, and can be expressed in the follow equation:

$$Mel\{x\} = 2595 \cdot \log_{10}\left(1 + \frac{x}{700}\right)$$

The output of mel-filtering from block 42, which is denoted by numeral 112, is subjected to a logarithmic conversion using a base-10 logarithm function at block 44. The output of the block 44 is further subjected to a post-processing step 46, where the means of the short-term, time-domain, feature-vector components are computed and added to the logarithmically-warped spectral components. The result from the post-processing step 46, which is denoted by numeral 116, is subjected to a Principal Component Analysis (PCA) transform in order to produce a set of cepstrum coefficients 130.

Preferably, low-pass filtering, as shown in filter block 58, is carried out by a data-driven filter. Feature-vector normalization of the feature vectors in the normalization device 54 compensates the changes in the speech parameter statistics in various environments. A data-driven filter filters the feature-vector coefficients with a pre-defined digital filter. The principle of a data-driven filter is that the properties of the filter have been estimated from feature vectors of a speech signal. Thus, the filter tries to make the signal more like speech and reduces the power of a noisy signal. In particular, a RelAtive SpecTrAl (RASTA) processing filter can be designed to be data-driven, as disclosed in "Data-Driven Design of RASTA-Like Filters" (Vuuren et al., *Proc. EUROSPEECH*, pp. 409–412, 1997). The principle of the RASTA method, as discussed in "RASTA Processing of Speech" (Hermansky, *IEEE TRANS. on Speech and Audio Processing*, vol. 2, no. 4, pp. 578–589, 1994), is based on the fact that human hearing is relatively insensitive to slowly varying stimuli. This relative insensitivity may partially explain why human listeners do not seem to pay much attention to a slow change in the frequency characteristics of the communication environment or why steady background noise does not severely impair human speech communication. A RASTA-like filter uses a spectral estimate in which each frequency channel is band-pass filtered by a filter with a sharp spectral zero at the zero frequency. Since any constant or slowly varying component in each frequency channel is suppressed by this operation, the new spectral estimate is less sensitive to slow variations in the short-term spectrum. The steps of RASTA filtering are as follows: computing the critical-band power spectrum; transforming the spectral amplitude through a compressing, static, non-linear transform; filtering the time trajectory of each transformed spectral component; raising the power to simulate the power law of hearing; and computing an all-pole model of the resulting spectrum.

Figure 4:
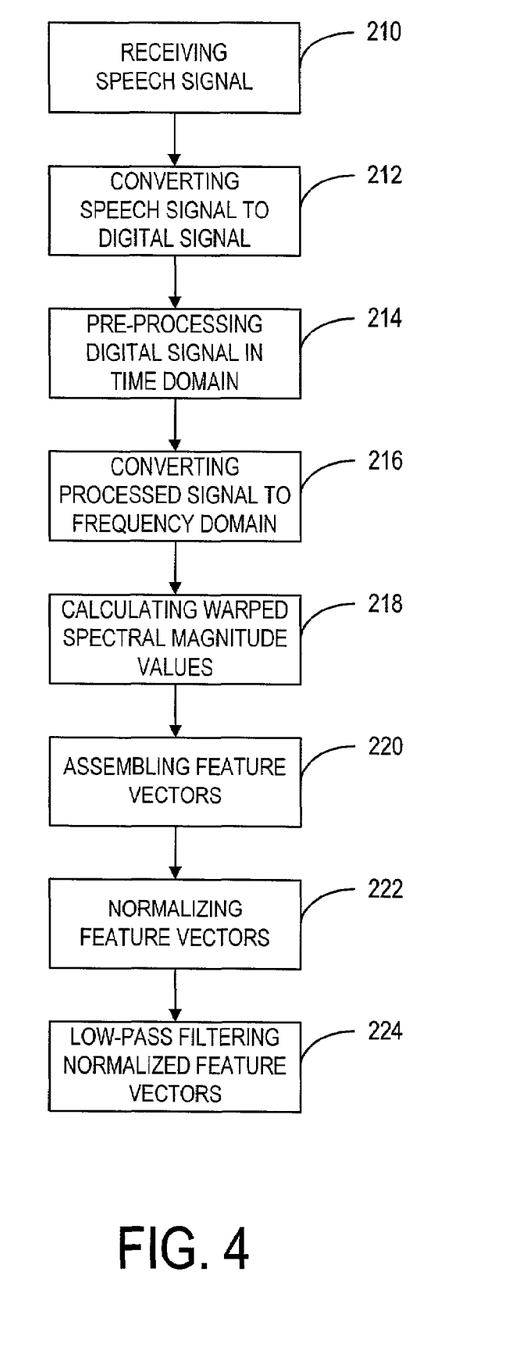
FIG. 4 is a flow chart illustrating the method for speech feature extraction in a DSR front-end, according to the present invention.

FIG. 4 illustrates the method of speech feature extraction in a DSR front-end, according to the present invention. As shown in FIG. 4, the DSR front-end receives a speech signal at step 210. The received signal is converted from analog to digital at step 212. The digital signal is subjected to framing, pre-emphasis and windowing at step 214. The time-domain pre-processed signal is subjected to a Fast Fourier transform to compute the spectrum (frequency) representation of a time-domain signal at step 216. A process of non-linearly modifying the scale of the Fourier transform representation of the speech spectrum is performed at step 218 in order to calculate a set of cepstral coefficients. A sequence of feature vectors is assembled from the cepstral coefficients at step 220. The frequency content of the feature-vector sequence is normalized at step 222 in order to change the feature parameters in various environments. Finally, a low-pass filter is used to reduce the noise component in the speech features at step 224.

FIGS. 5A and 5B show a non-normalized cepstrum modulation spectrum and a normalized cepstrum modulation spectrum, respectively. The logarithmic amplitude of the background noise spectrum is shown in dashed lines, while the logarithmic amplitude of the speech spectrum is shown in solid lines. As seen in FIG. 5A, the power of the noise spectrum is lower than the power of the speech spectrum throughout the entire frequency range of 0–50 Hz. If the signal is filtered by a low-pass filter, the same amount of noise and speech is removed. However, after normalization, as shown in FIG. 5B, the power of noise is higher than the power of speech with frequencies above 10 Hz. This means that if the signal is filtered by a low-pass filter, more noise is removed than speech. With a data-driven filter, each feature vector component is filtered with its own filter such that the properties of the filter are evaluated from the speech modulation spectrum of the feature vector component. Thus, the filter tries to make the signal look like speech and reduces the power of the noisy signal.

The advantage of using a low-pass filter to remove noise from a normalized cepstral modulation spectrum is shown in Table 1 and Table 2. In Table 1 and Table 2, the data in the row marked "Baseline" are the result of a DSR front-end where normalization is carried out for feature vectors, but the normalized cepstral modulation spectrum is not filtered by a data-driven filter. The data in the row marked "Data-Driven" are the result of the data-driven filter to remove noise from a normalized cepstral modulation spectrum. Table 1 shows the result of using a name dialer to dial a list of 30 short names in order to test the accuracy in speech recognition. Table 2 shows the result of using the name dialer to dial a list of 30 long names. As can be seen in Table 1 and Table 2, the stationary car noise can be removed more effectively than the non-stationary noise in a cafeteria. Also, the improvement in noise filtering using the data-driven filter is more noticeable in the low Signal-to-Noise Ratio (SNR) environments.

amplitude of background noise. As shown, the improvement of noise filtering, as shown in Table 2, is more pronounced at low SNR settings. The combination of feature vector normalization and the data-driven filter in a DSR front-end is, in general, effective in reducing noise in a speech signal. In a data-driven filter, the filter parameters are calculated from the speech signal. The normalization of feature vectors may significantly change the speech parameter statistics in various environments. It should be noted that the shape of the data-driven filter can vary between different front-ends and cepstrum coefficients. In particular, the data-driven filter for the delta coefficients looks more like a band-pass filter.

Figure 6:
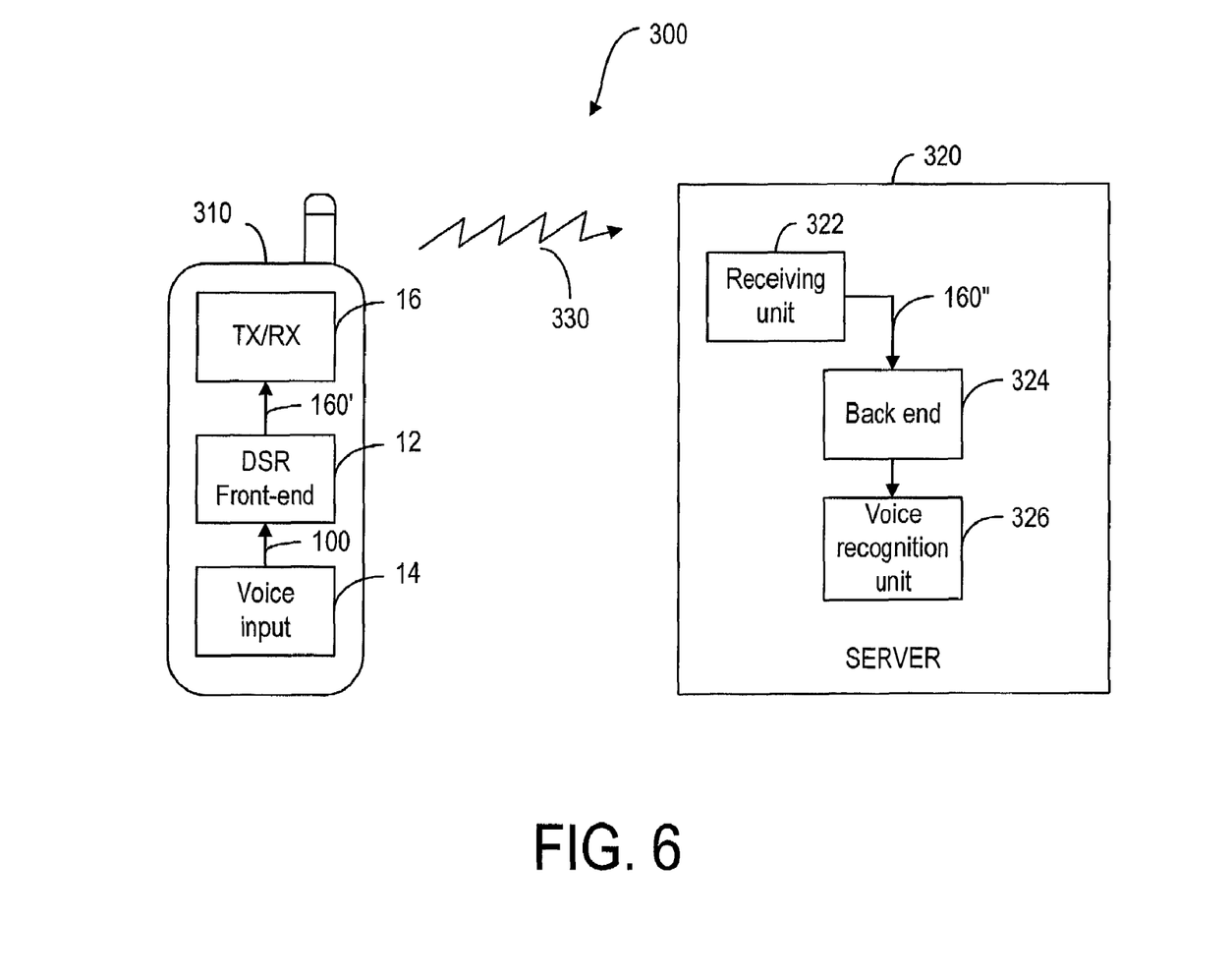
FIG. 6 is a diagrammatic representation illustrating a communication network comprising a communication device and a server, according to the present invention.

Advantageously, the distributed-speech recognition front-end 12 of the present invention can be implemented in a communication device 310 for communicating with other communication devices (not shown) through a server 320 in a communication network 300. As shown in FIG. 6, the communication device 310, such as a mobile terminal, comprises a voice-input unit 14, such as a microphone, to allow a user to give verbal commands or input spoken messages to the communication device 310. The voice signal 100, as provided by the voice-input unit 14, is conveyed to the distributed-speech recognition front-end 12. The down-sampled speech data 160' from the front-end 12 is provided to a transceiver unit 16. The speech data 160' is included in signals 330 to be conveyed to the server 320. Upon receiving the signals 330, a receiving unit 322 extracts the down-sampled speech data 160" and conveys the data to a distributed-speech recognition back-end 324, such as the back-end 7 of FIG. 1B. The signal 190, indicative of normalized feature vectors, is provided to a voice recognition unit 326, which recognizes the voice commands or the spoken messages input by the user to the communication device 310.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for speech processing in a distributed-speech recognition system having a front-end and a back-end for recognizing words from speech signals in a time domain, said method comprising the steps of:

TABLE 1

| Environment | clean | car 0 | car −5 | car −10 | café 10 | café 5 | café 0 | Average |
|---|---|---|---|---|---|---|---|---|
| Baseline | 99.3% | 96.3% | 90.2% | 71.0% | 98.0% | 94.8% | 81.9% | 90.2% |
| Data-Driven | 99.3% | 96.3% | 92.0% | 77.0% | 97.8% | 94.2% | 79.5% | 90.9% |

TABLE 2

| Environment | clean | car 0 | car −5 | car −10 | café 10 | café 5 | café 0 | Average |
|---|---|---|---|---|---|---|---|---|
| Baseline | 99.6% | 98.7% | 98.2% | 86.7% | 99.4% | 99.2% | 96.1% | 97.0% |
| Data-Driven | 100.0% | 99.6% | 99.2% | 93.2% | 99.5% | 99.2% | 95.5% | 98.0% |

Four different noisy backgrounds, each with different signal-to-noise (SNR) settings, are used to show the effect of noise filtering. The signal-to-noise ratio, as used here, can be defined as the ratio between the arithmetic mean of peak amplitudes of speech and the root-means square (rms)

transforming the speech signals in the time domain for obtaining spectrum representation of the speech signals in a frequency domain;

transforming the spectrum representation for obtaining speech features in a cepstral domain; wherein the speech features comprise a speech component and a noise component in a speech-to-noise ratio;

normalizing the speech features for providing normalized speech features having a reduced speech-to-noise ratio;

filtering the normalized speech features in a frequency domain for reducing the noise component; and conveying the filtered speech features from the front-end to the back-end.

2. The method of claim 1, wherein the filtering step is carried out with a low-pass filter.

3. The method of claim 1, wherein the filtering step is carried out with a data-driven filter.

4. The method of claim 1, further comprising the step of converting the speech signals from a time domain to a frequency domain prior to extracting the speech features.

5. The method of claim 4, further comprising the step of converting the speech signals to digital signals prior to converting the speech signals from the time domain to the frequency domain.

6. The method of claim 4, wherein the time-to-frequency domain conversion is carried out by a Fast Fourier Transform in order to compute a magnitude spectrum and provide a plurality of magnitude spectrum values.

7. The method of claim 6, further comprising the step of non-linearly modifying the magnitude spectrum in order to generate a plurality of logarithmically-warped magnitude spectrum values.

8. The method of claim 7, further comprising the step of assembling the logarithmically-warped magnitude spectrum values in order to produce a set of feature parameters representative of the speech features.

9. A distributed speech recognition front-end comprising:
first means, responsive to a speech signal in a time domain, for obtaining spectral representation of the speech signal in a frequency domain;
second means, responsive to the spectral representation, for extracting speech features in a cepstral domain and for providing a first signal indicative of the extracted speech features, the extracted speech features comprising a speech component and a noise component in a speech-to-noise ratio;
third means, responsive to the first signal, for normalizing the extracted speech features in order to provide normalized speech features having a reduced speech-to-noise ratio and for providing a second signal indicative of the normalized speech features;
fourth means, responsive to the second signal, for filtering the normalized speech features in the frequency domain in order to reduce the noise component in normalized speech features and for providing a third signal indicative of the filtered speech features; and
means for conveying the third signal to a distributed speech recognition back-end in order for the back-end to recognize words representative of the speech signal from the third signal.

10. The front-end of claim 9, wherein the fourth means comprises a data-driven filter.

11. The front-end of claim 9, wherein the fourth means comprises a low-pass filter.

12. The front-end of claim 9, wherein the first means comprises:
a time-domain, pre-processing device to convert the speech signal to a digital signal;
a time-to-frequency domain conversion device to provide a set of magnitude spectrum values from the digital signal; and
an assembly device to assemble the set of magnitude spectrum values into the speech features in the cepstral domain.

13. The front-end of claim 9, wherein the third signal has a sampling rate, said front-end further comprising means to reduce the sampling rate prior to conveying the third signal to the distributed speech recognition back-end.

14. A distributed speech recognition system for processing a speech signal, said system comprising:
a front-end, responsive to the speech signal, for extracting speech features in a cepstral domain from the speech signal and for providing a first signal indicative of the extracted speech features, the extracted speech features comprising a speech component and a noise component in a speech-to-noise ratio; and
a back-end, responsive to the first signal, for recognizing words representative of the speech signals and for providing a second signal indicative of the recognized words, wherein
the front-end has means to normalize the extracted-speech features for providing normalized speech features with a reduced speech-to-noise ratio and means to filter the normalized speech features in order to reduce the noise component.

15. The system of claim 14, wherein the filtering means comprises a low-pass frequency filter.

16. The system of claim 14, wherein the filtering means comprises a data-driven filter.

17. A speech recognition feature extractor for extracting speech features from a speech signal, comprising:
a time-to-frequency domain transformer for generating spectral magnitude values in a frequency domain of the speech signal and for providing a first signal indicative of the spectral magnitude values;
a feature generator, responsive to the first signal, for generating a plurality of feature vectors in a cepstral domain and for providing a second signal indicative of the generated feature vectors, the feature vectors comprising a speech component and a noise component in a speech-to-noise ratio;
a normalizing means, responsive to the second signal, for normalizing the generated feature vectors in order to provide normalized feature vectors having a reduced speech-to-noise ratio and for providing a third signal indicative of the normalized feature vectors; and
a frequency filtering means, responsive to the first signal, for reducing the noise component in the normalized feature vectors and for providing the extracted speech features indicative of the noise-reduced feature vectors.

18. The extractor of claim 17, wherein the frequency filtering means comprises a low-pass filter.

19. The extractor of claim 17, wherein the frequency filtering means comprises a data-driven filter.

20. A communication device having a voice input unit to allow a user to input speech signals to the device, and means for providing speech data to an external apparatus, wherein the external apparatus includes a distributed-speech recognition back-end capable of recognizing speech based on the speech data, said communication device comprising
a front-end unit, responsive to the speech signals, for extracting speech features in a cepstral domain from the speech signals for providing a first signal indicative of the extracted speech features, the extracted speech features comprising a speech component and a noise component in a speech-to-noise ratio, wherein the front-end unit includes:

means, responsive to the first signal, for normalizing the extracted-speech features for providing a second signal indicative of the normalized speech features, the normalized speech features having a reduced speech-to-noise ratio, and means, responsive to the second signal, for filtering the normalized speech features in order to reduce the noise component in the filtered speech features and for including the filtered speech features in the speech data.

* * * * *